(No Model.)
T. C. ELVIN.
CAR WHEEL.
No. 312,263. Patented Feb. 17, 1885.
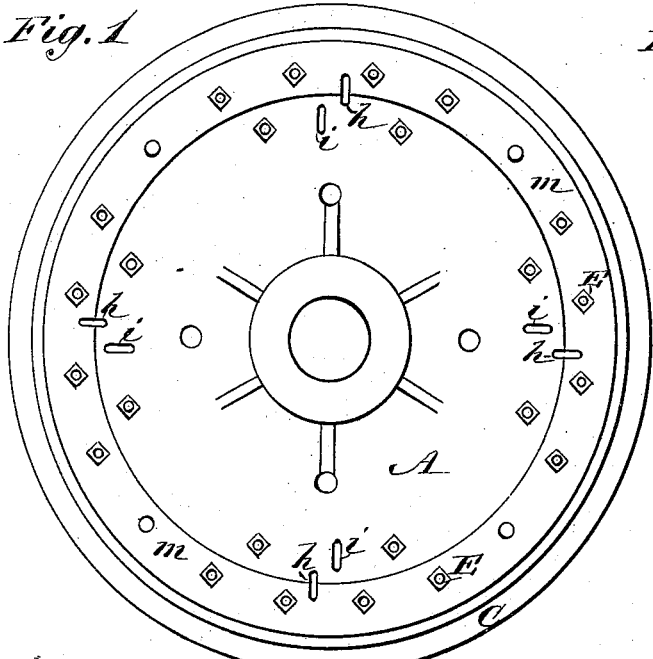
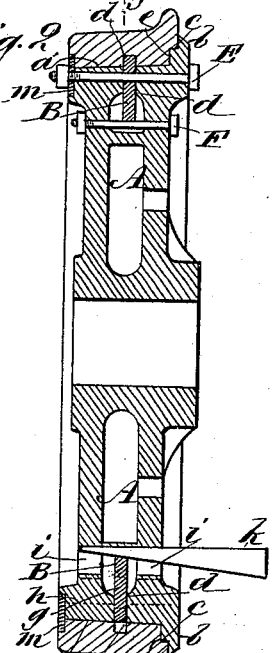
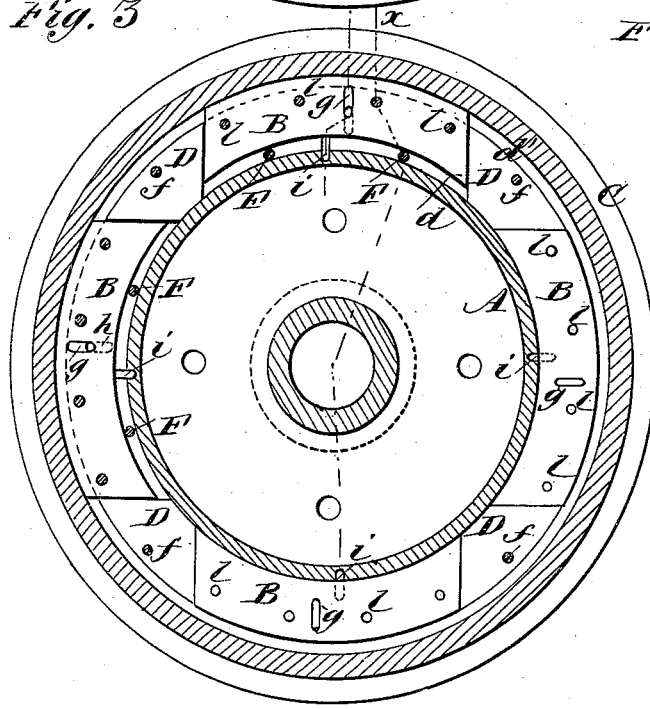
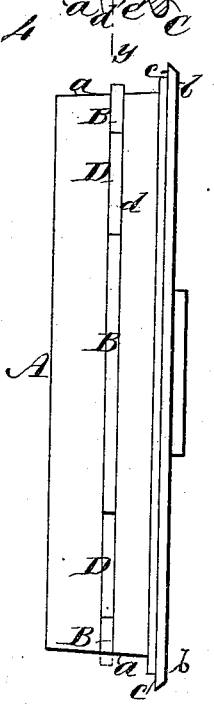
WITNESSES:
C. Neveux
C. Sedgwick
INVENTOR:
T. C. Elvin
BY Munn & Co
ATTORNEYS.

UNITED STATES PATENT OFFICE.

THOMAS C. ELVIN, OF HUNTINGTON, INDIANA.

CAR-WHEEL.

SPECIFICATION forming part of Letters Patent No. 312,263, dated February 17, 1885.

Application filed June 24, 1884. (No model.)

*To all whom it may concern:*

Be it known that I, THOMAS C. ELVIN, of the city and county of Huntington, and State of Indiana, have invented certain new and useful Improvements in Car-Wheels, of which the following is a full, clear, and exact description.

This invention consists in a car-wheel of novel construction, the central or body portion of which is made in a single piece, and the tire held thereon by inner locking-plates and cross-bolts, and in which special means are provided for repairing the wheel without removing it from the car, and whereby a safe, durable, and easily-fitted wheel is obtained, substantially as hereinafter described.

Reference is to be had to the accompanying drawings, forming a part of this specification, in which similar letters of reference indicate corresponding parts in all the figures.

Figure 1 represents a view of a railroad-car wheel embodying my invention as seen from its inner side or face; Fig. 2, a transverse section of the same on the irregular line $x\ x$ in Fig. 3; Fig. 3, a section of the wheel transversely to its axis on the line $y\ y$ in Fig. 2; and Fig. 4, a rim or edge view of the wheel with tire removed.

A is the body of the wheel, made in one piece and turned a little tapering on its rim or periphery $a\ a$, also having an outer flange, $b$, on its inner or larger side turned to form an interior annular shouldered recess, $c$.

Intersecting the rim of the body A of the wheel, parallel with the opposite sides or faces of the wheel, is an annular cut slot, $d$, into which radially-sliding plates B fit.

C is the tire of the wheel, bored out to form a snug fit over the rim $a\ a$ of the body, and turned with a shouldered recess, $e$, to fit the shouldered portion $c$ of the rim, also having an intermediate annular groove, $d'$, corresponding with the slot $d$ in the rim $a\ a$. The plates B have their opposite ends parallel with one another, and between said ends of said plates, within the slot $d$, are fitted blocks D, firmly riveted or secured to their places, as at $f$, and serving as guides for the radially-sliding plates B when putting the wheel together. These plates, when entered from the outside through or within the slot $d$ before the tire is put on, rest by their inner edges on the bottom or inner wall of the slot $d$, as shown, for the plates at the right hand and bottom of Fig. 3, and each of said plates B is made with a slot, $g$, running in direction of its width through it. When said plates are forced outward between the guiding-blocks D, as shown for the upper plate in Fig. 2 and upper and left-hand plates in Fig. 3, which is after the tire C has been put on, they enter the groove $d'$ in the tire, and serve to assist in locking or holding the tire on the wheel. The body A of the wheel is also provided with slots $h$ through it, in line with the slots $g$ in the plates B, but arranged to extend internally beyond the slots $g$ when said plates are forced out, and said body is furthermore provided with a series of slots, $i$, through it, between the blocks D, arranged to extend below the bottom of the slot $d$. Temporary bolts are used to put on and draw up the tire of the wheel to its place. Said bolts are then removed, and the sliding or locking plates B pushed or forced outward to engage with and enter the groove $d'$ in the tire by inserting a temporary key, $k$, as shown in Fig. 2, through the slots $i$ in the body for each of the plates, and by the action of said keys as the same are driven inward against the inner edges of the plates said plates are forced outward into locking connection with the tire, as required. Permanent bolts E are then passed through the body of the wheels and holes $l$ in the plates B, and the bolts F driven through said body back of the inner edges of said plates, and these several bolts E F tightened up, which completes the construction of the wheel, or mainly so. The bolts E pass through a steel or other metal ring, $m$, on the outer face of the wheel, closing the joint on said side of the wheel between the tire and body of the wheel. On the other side of the wheel the joint is a lapped or shouldered one, as described. By this construction dust is excluded from entering between the tire and body of the wheel.

To take the tire from the wheel, the bolts E F and ring $m$ are first removed, and keys similar to the one $k$ (shown in Fig. 2) driven through the slots $h$ in the body of the wheels and slot $g$ in the plates B, which are thereby forced inward out of the groove $d'$ in the tire, that may then be taken from off the body.

The wheel may be made either with a cast-iron body and chilled tire or cast-iron body with steel tire, cast-steel body with chilled tire, or cast-steel body with steel tire.

This improved wheel has a solid or single center—that is, its central portion or entire body is made of a single piece—and the tire is drawn onto it firm and solid and securely held thereon by the bolts and locking-plates, with every facility for removing the tire (which is the part most liable to injury or wear) when required to replace it with another, and for putting on the new tire, without removing the wheel from the car or its axle. This may be done cheaply by unskilled hands. A rigid and durable construction is secured for the wheel, and the parts, which are not especially numerous, are readily fitted to their places, and the whole when put together makes a solid, durable, and safe wheel. The tire is positively and rigidly locked, and not held by springs entering a groove in the inner periphery of the tire and controlled by cams, nor is the body of the wheel made in sections separately secured to the hub and entering grooves in the inner periphery of the rim, and the whole secured by tapering bolts, as in certain other car-wheels.

Having thus described my invention, I claim as new and desire to secure by Letters Patent—

1. A wheel consisting, essentially, of a body or central portion provided with an annular slot in the face of its rim, locking-plates within said slot, a tire provided with an interior annular slot registering with that of the body when in place and adapted to receive a part of said locking-plates, and bolts passing through said body portion and locking-plates, substantially as set forth.

2. The body or central portion, A, of the wheel, constructed with an annular slot, $d$, through its rim and key slots or openings $h\ i$ through its sides, in combination with the blocks D, the sliding locking-plates B, the tire C, having a groove, $d'$, in its inner periphery, and bolts passing through the locking-plates and sides of the wheel, essentially as described.

3. The ring $m$, in combination with the slotted rim $a\ a$ of the body of the wheel and shouldered flange $b$ thereof, the tire C, constructed to fit said rim and flange and grooved on its inner periphery, and the bolts E F, substantially as specified.

THOMAS C. ELVIN.

Witnesses:
JAMES M. HATFIELD,
JOHN G. PRICE.